May 16, 1967
G. A. NOBLE ETAL
3,320,558
ELECTRIC SWITCH
Filed Dec. 23, 1965
2 Sheets-Sheet 1
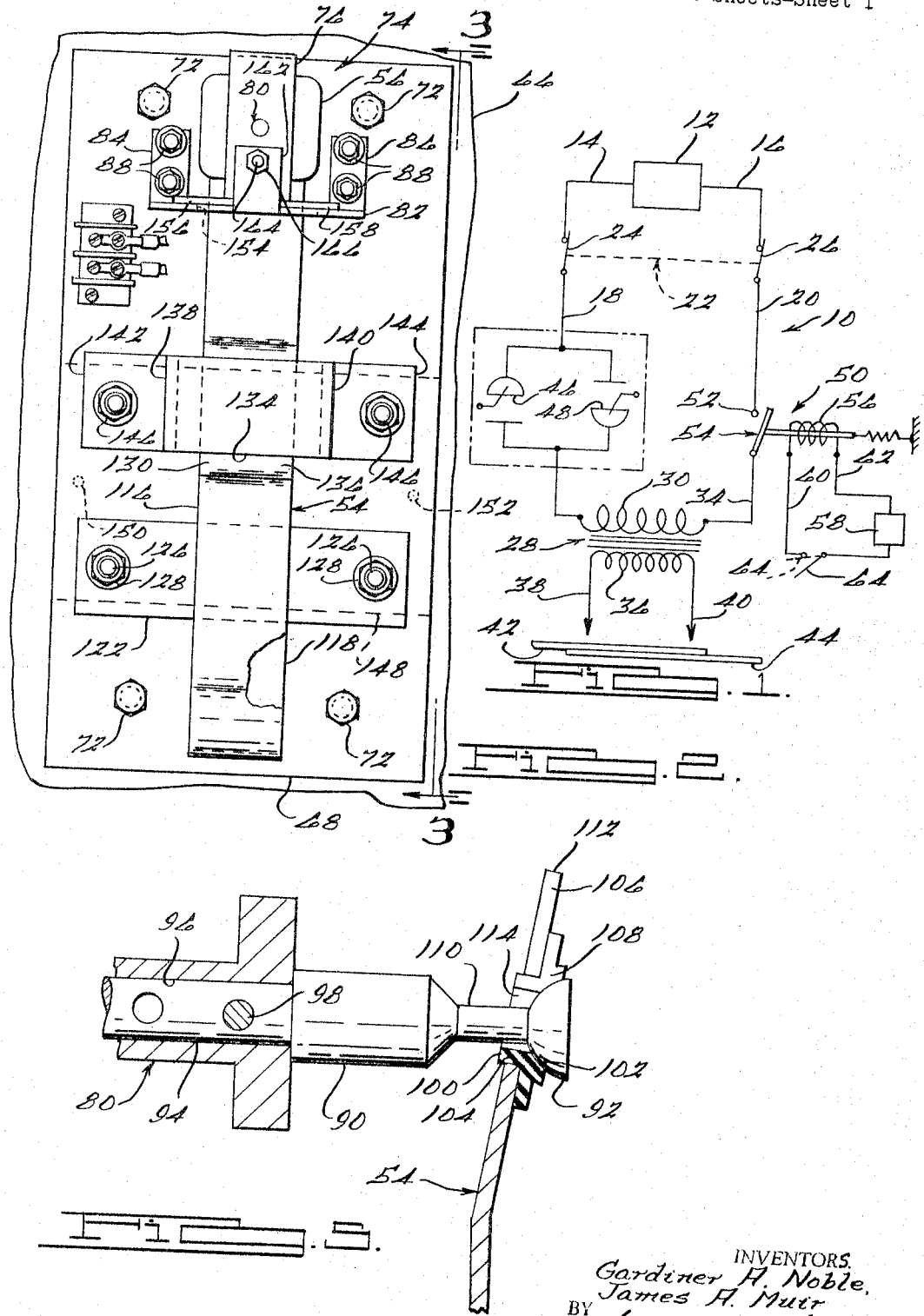
INVENTORS.
Gardiner A. Noble.
James A. Muir
BY
Harness & Harris
ATTORNEYS.

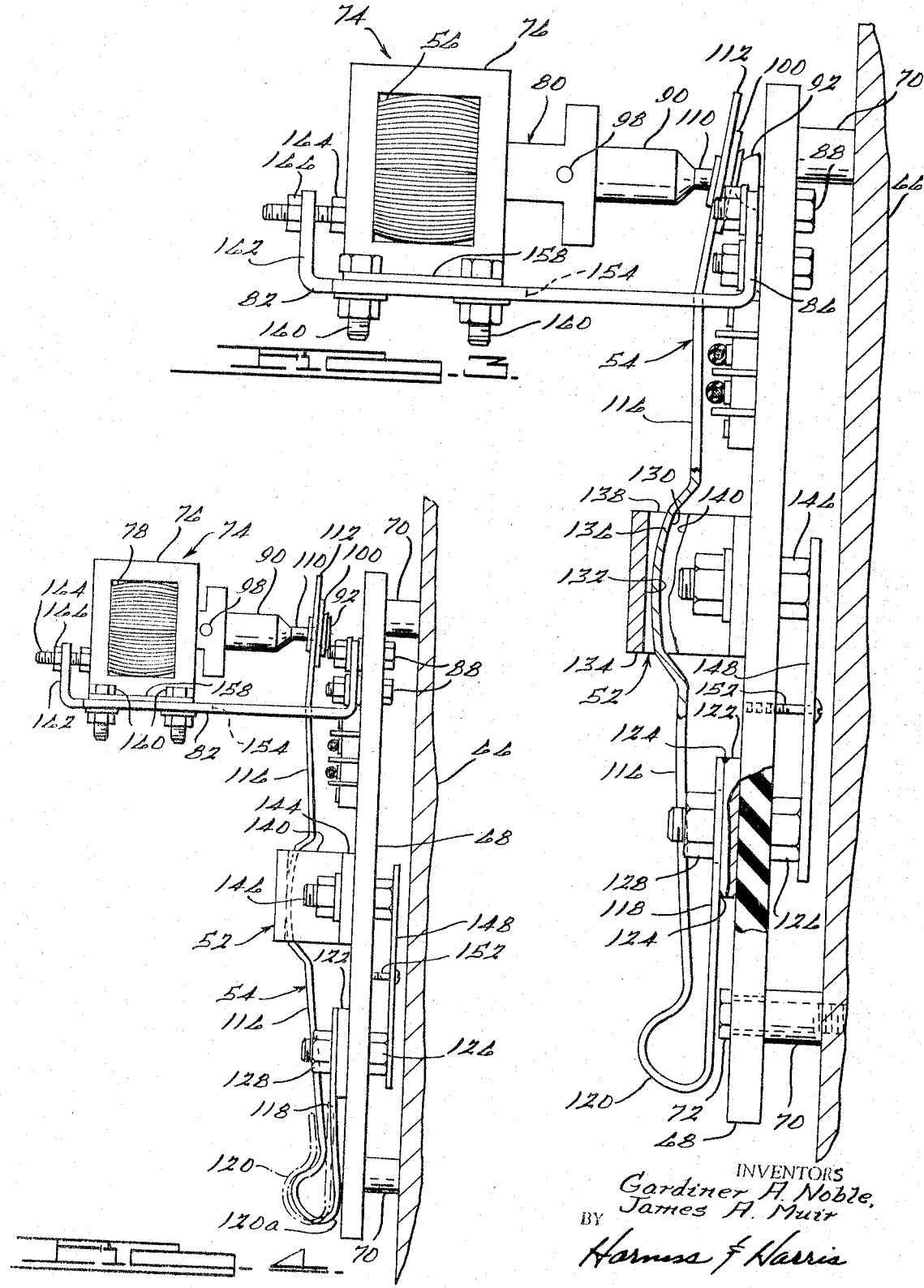

United States Patent Office 3,320,558
Patented May 16, 1967

3,320,558
ELECTRIC SWITCH
Gardiner A. Noble, Farmington, and James A. Muir, Roseville, Mich., assignors to Chrysler Corporation, Highland Park, Mich., a corporation of Delaware
Filed Dec. 23, 1965, Ser. No. 515,881
4 Claims. (Cl. 335—147)

This invention relates generally to an electric switch and more particularly to an electric switch for closing a circuit which carries a relatively high current as, for example, for an associated welding apparatus.

In many forms of welding machines as, for example, in multiple electrode spot welding machines, the movable electrodes, which are connected to the secondary side of the welding transformer, are not grounded when not in a welding portion of the operating cycle.

Consequently, it has become accepted practice to provide automatically actuated ignitrons on one side of the primary coil of the welding transformer and an electrically operated contactor on the other side of the same primary coil. As a result of this arrangement the welding transformer becomes electrically isolated during such periods as when the welding machine is not in the welding portion of its operating cycle.

In a spot welding machine, a complete operating cycle includes all of the elapsed time starting from the moment the movable electrode or electrodes start their movement toward the work piece, including, of course, the time spent in the actual welding, followed by a period of pressure applied to the work piece by the cooperating electrodes and of course, the time required for the movable electrodes to return to their initial starting positions.

Accordingly, a spot welding machine operating cycle can be considered as consisting of four generally distinct operating funtions or events, such as the following:

(1) Squeeze time—that required for the movable electrodes to move from a starting positon to and against the work piece so as to apply a predetermined force thereagainst;

(2) Weld time—that period of time, immediately following the squeeze time, during which current is applied to the work piece by the electrodes;

(3) Hold time—that period of time immediately following the termination of the weld time during which no further current is applied to the work piece but during which time the electrodes are maintained with a predetermined force against the work piece in order to assure proper bonding of the weld area; and (4) Off time—that period of time immediately following the hold time during which the movable electrodes are returning to their respective start positions for the next cycle.

In the usual spot welding machine arrangements, the ignitrons, by mean of suitable switch means are caused to close at either the start of the operating cycle or subsequent thereto but, in any event, during the squeeze time. The closing of the ignitrons, of course, completes the electrical circuit therethrough.

In some welding machines the electrical contactor, provided on the other side of the primary coil of the welding transformer, is actuated to a closed position simultaneously with the closure of the ignitrons, while in other machines the contactor is closed either before or after closure of the ignitrons. However, in all of such arrangements, closure of both the ignitrons and electrical contactor completes the circuit through the primary coil of the welding transformer thereby energizing the welding electrodes which are connected to the secondary coil of the welding transformer.

The circuit through the welding transformer primary coil is maintained closed during the entire period defined as the weld time and opened by the opening of the ignitrons in order to establish the next stage or hold time.

The use of an isolating contactor in the primary circuit of a welding transformer is well known in the art. However, all of the isolating contactors heretofore employed have not proven to be satisfactory. In fact, the use of such prior art contactors can result in a hazardous situation.

For example, during the weld time there is a high current flow through the contacts of the isolating contactor. Such high currents in turn create electromagnetic forces which at least tend to move the said contacts away from each other. In some instances it has been found that the electromagnetic field created by the high current has actually forced the contacts apart resulting in the production of an electrical arc thereacross. The heat generated by such an arc causes the said contacts to at least partially melt and when the contacts snap back against each other the melted condition of said contacts results in said contacts being permanently welded together.

Once such a welded condition of the contacts occurs, the contactor can no longer perform its isolating function.

In addition to the above, the prior art contactors have been found lacking in other respects. For example, the prior art contactors have been found to a relatively short useful life. This, it is believed, is caused by localized areas of high heat brought about by the construction of the contactor itself. That is, usually, the prior art contactors require the use of an electrically conductive flexible cable leading to one of the contacts which, in turn, requires not only a mechanical connection but also a metallurgical bond achieved as by soldering. Subsequently, during use, the soldering flux material causes pitting which, in turn, results in areas of high electrical resistance and temperature. The increase in temperature causes a further break-down in the solder connection which, in turn, still further increases the temperature in that area.

Further, in the prior art contactors, the actuating coils for closing the contacts have to be extremely large in order to try and overcome the generated electromagnetic forces trying to separate such contacts. This also results in a relatively large power consumption with, of course, attendant losses in the form of generated heat.

Accordingly, it is a general object of this invention to provide an isolating contactor which is so constructed as to eliminate the tendency of the contacts thereof to separate during flow of welding current therethrough.

Another object of this invention is to provide in an isolating contactor, an arrangement of electrical contacts which, during use, continually clean themselves so as to assure the best possible path for current flow therethrough.

Another more specific object of this invention is to provide an isolating contactor, an arrangement of electrical contacts whereby the said contacts are urged toward each other during the flow of welding current therethrough thereby eliminating the possibility of having an electrical arc occur therebetween.

Other more specific objects and advantages of this invention will become apparent when reference is made to the following description taken in conjunction with the accompanying drawings wherein:

FIGURE 1 is a schematic wiring diagram illustrating a typical welding machine wiring circuit including a schematic representation of the contactor of this invention;

FIGURE 2 is a front elevational view of an electrical isolating contactor constructed in accordance with this invention;

FIGURES 3 and 4 are side elevational views of the contactor of FIGURE 2, taken generally on the plane of line 3—3 of FIGURE 2, with portions thereof broken away and in cross-section illustrating the contactor in open and closed positions, respectively; and FIGURE 5 is an enlarged fragmentary portion of the contactor, in cross-section, illustrating the connection between certain elements of the contactor.

Referring now in greater detail to the drawings, FIGURE 1 illustrates a primary welding circuit 10 as being comprised of a suitable electrical (A.C.) power source connected to conductors 14 and 16 which are respectively connected to conductors 18 and 20 as by a manually operable switch 22 having electrical contacts 24 and 26. A welding transformer 28 has its primary winding 30 connected in series relationship with conductors 32 and 34 while its secondary winding 36 is electrically connected to the movable spot welding electrodes 38 and 40. A work piece, to be joined by electrodes 38 and 40, is illustrated by members 42 and 44.

A pair of ignitrons 46 and 48, arranged in general parallel relationship to each other, are serially connected to conductors 18 and 32 so as to at times complete the welding circuit therethrough. Further, an isolating contactor, constructed in accordance with this invention and schematically illustrated at 50, is adapted to at times close the circuit through conductors 20 and 34 as by closure of contacts 52 and 54.

Movement of contact 54 against contact 52 is achieved by means of a suitable coil 56 which is in series with a suitable source of electrical potential 58 by means of conductors 60 and 62. A switch 64 is provided in circuit with coil 56 so that whenever switch 64 is open, contacts 52 and 54 are also open as illustrated in FIGURES 1 and 3.

The isolating contactor 50, as shown in FIGURES 2 and 3, is illustrated as being mounted to, for example, a suitable support 66 which may in fact be a portion of a related welding machine. As illustrated, the contactor 50 is comprised of a base 68, of suitable electrical insulating material, which is provided with a plurality of bushing-like spacers 70 through which suitable fasteners, such as the screw shown at 72, may extend so as to secure the base 68 to the support 66.

The upper end of base 68 serves to support a solenoid assembly 74, comprised of a frame 76, coil 56 and armature 80, by means of a generally laterally extending bracket 82 which is provided with foot portions 84 and 86. Each of the foot portions 84 and 86 are secured to base 68 as by means of suitable fasteners 88.

As best shown in FIGURE 5, armature 80 has secured thereto an extension 90 which has a spherical end portion 92 for interconnection with one end of the movable contact 54. Member 90 may, of course, be secured to armature 80 by any suitable means. As illustrated in FIGURE 5 member 90 has a portion 94 of reduced diameter which is received within a bore 96 of armature 80 and secured thereto as by a transverse press-fitted pin 98.

Preferably, a bushing 100 having a spherical seat 102 is received within an aperture 104 formed in movable contact 54. A slot 106 formed in contact 54 and a slot 108 formed in bushing 100 are aligned with each other and are of a width sufficient to permit the passage therethrough of stem portion 110 of extension 90. Accordingly, this permits extension 90 to be operatively assembled to movable contact 54 by passing stem 110, from end 112 of contact 54, through slot 106 and slot 108 and into the interior opening 114 of bushing 100.

Referring to FIGURES 2 and 3, it can be seen that the movable contact 54 is of a generally U-shaped or hairpin-like configuration with leg portions 116 and 118 joined as by a bight portion 120. The entire contact 54 is preferably formed of copper and it has been found that for this purpose the use of class-2 copper, which is approximately 99% pure copper and 1% chromium, provides excellent results.

The inner-most leg 118 is secured to a transversely directed bar 122 as by welding (indicated generally at 124 of FIGURE 3) and the cross bar 122 is in turn anchored to the insulating base 68 by means of screws 126 and nuts 128. In the formation of contact 54 the bight 120 is formed so as to result in legs 116 and 118 being resiliently urged toward each other. Accordingly, since the end of leg 118 is anchored to the base 68 by means of cross-bar 122 and the cooperating fasteners, leg 116 normally tends to move towards leg 118 thereby moving armature 80 and extension 90 to an extended position as illustrated in FIGURE 3.

As seen in both FIGURES 3 and 4, leg 116 has a somewhat arcuate contacting portion 130 formed therein intermediate the ends of leg 116. The stationary contact 52 is formed to be of generally U-shaped configuration and positioned so as to be generally transverse to and bridging movable contact 116. Inner surface 132 of the intermediate portion 134 of stationary contact 52 is adapted to be at times engaged by the outer surface 136 of arcuate portion 130 of movable contact 54. Leg portions 138 and 140 of contact 52 are provided with transversely extending flanges 142 and 144, respectively, which are secured to the insulating base 68 as by suitable screw fasteners 146. Preferably, an insulating cover member 148, secured to the under-side of base 68 as by means of screws 150 and 152, is provided in order to preclude the accidental creation of an electrically conductive path between screws 126 and 146.

Bracket 82 has formed therein a generally medial opening 154 which permits the free passage therethrough of leg 116 of movable contact 54. Frame 76 of armature assembly 74 has generally laterally extending flanges 156 and 158 which are secured to bracket 82 as by screws 160. If desired, a tab like portion 162 may be provided with a screw 164, threadably engaged therewith, for adjusting the position of the solenoid assembly 74 with respect to the bracket 82. In such instances it is preferred that a locking nut 166 also be provided.

*Operation of invention*

Referring to FIGURES 1 and 2 the conductor 34 of FIGURE 1 could be operatively connected to the laterally extending cross member 122 as by means of a suitable connection with, for example, one of the screws 126 and nuts 128. Likewise, conductor 20 of FIGURE 1 could in the same manner be secured to one of the flange portions such as 142 by means of a coacting fastener 146. Accordingly, with the movable contact 54 being in a position as illustrated by FIGURE 3, the circuit from conductors 20 to 34 would be open as is schematically illustrated by the wiring diagram of FIGURE 1.

At an appropriate time in the overall welding cycle switch 64, or the functional equivalent thereof, would be closed so as to energize the coil winding 56 (shown in FIGURES 1 and 3) of solenoid assembly 74. Energization of coil 56 causes the armature 80 to move to the left as viewed in FIGURES 3, 4 and 5 thereby moving end 112 of leg 116 of movable contact 54 generally to the left in a manner causing the leg 116 to move in a path which might be described as being generally counter-clockwise about bight 120.

As movable contact leg 116 is thusly moved, the generally arcuate portion 130 moves toward the bridging portion 134 of stationary contact 52. Such movement is continued until the outer surface 136 of arcuate portion 130 engages the inner surface 132 of bridging portion 134. Even though contact between surfaces 132 and 136 is established, armature 80 and extension 90 continue to move a further predetermined distance thereby imparting at least a slight rocking motion to leg 16 generally about the arcuate portion 130. For example, referring to FIGURE 4, it can be seen that when the armature 80 is moved its full distance that the bight 120 of the movable contact 54 is moved from its orginal position, represented in phantom line, to a new position 120a as illustrated in solid line. This movement of the bight end of movable contact 54 is accomplished by a motion which is not purely a rocking motion on surface 136 but rather a motion which is somewhat a translation of surface 136 with respect to inner surface 132 of bridging portion 134 as well as a simultaneous rocking about the outer surface 136. The translation of arcuate portion 130 is brought about by the fact that leg 118 of movable contact 154 is anchored to base 68 thereby preventing any vertical movement of leg portion 118 during the movement of leg 116 toward and against the bridging portion 134 of stationary contact 52.

Referring to both FIGURES 3 and 4, it can be seen that leg portion 118 is disposed in a generally cantilevered position a substantial distance away from the outer surface of base 68 by means of the laterally extending cross member 122. The space existing between leg 118 and base 68 is provided in order to enable the bight end 120 to move toward the base 68 during closure of contacts 54 and 52 as illustrated by FIGURE 4. As bight end 120 moves toward base 68, leg 118 is constrained to generally bow thereby reducing its effective length from the point of its anchorage, by screw 126, to the bight end 120. Consequently, this reduction in the effective length of leg 118 causes a generally vertical downward movement of leg 116 in order to accommodate the said reduction of effective length of leg 118. The downward movement of leg 116 then brings about a wiping action between the surface 136 and 132 of arcuate portion 130 and bridging portion 134, respectively.

In view of the above, it can be seen that the closure of contacts 52 and 54 occurs with an accompanying rocking and wiping action between surfaces 132 and 136. Such a combination of motions results in the contacting surfaces continually cleaning themselves so as to effectively preclude the build up of any pitted portions as might tend to occur because of oxidation of the contacting surfaces. Further, the same wiping and rocking motion tends to continually eliminate the presence of any foreign particles which might tend to accumulate on the contacting surfaces.

Another important feature of the invention is the fact that the current flowing through movable contact 54, at the time that contacts 52 and 54 are closed, aids in maintaining contacts 52 and 54 in a closed position. This is contrary to what is the norm in electrical contactors of the prior art. For example, current flowing through leg 118 causes a magnetic field thereabout which is of a polarity opposing the magnetic field which occurs about leg 116 because of the same current flowing therethrough. The opposing magnetic fields effectively urge legs 116 and 118 away from each other thereby further contributing to the force maintaining contacts 52 and 54 in a closed position. In the embodiment illustrated, leg 118 has been shown to be relatively shorter than the overall length of leg 116. The length of leg 118 and its position relative to the contacting surface 136 will, of course, influence the total magnetic force tending to maintain contacts 52 and 54 in a closed position. Accordingly, it should be apparent that, in a particular situation where the operating parameters are known, leg 118 may be made to any length sufficient to provide the necessary or desirable magnetic forces to maintain the surfaces 132 and 136 in contact with each other.

It should also be apparent that even though base 68 has been illustrated as being generally planar, it is of course possible to provide an additional clearance between leg 118 and base 68 as by means of, for example, cutting a slot or a groove within base 68 in general juxtaposition to leg 118.

Although only one embodiment of the invention has been disclosed and described, it is apparent that other embodiments and modifications of the invention are possible within the scope of the appended claims.

We claim:
1. An electric switch assembly, comprising a fixed first contact, a generally U-shaped conductor having one leg portion secured to a suitable support and an other leg portion angularly movable between said fixed contact and said one leg portion, a movable second contact carried by said other leg portion adapted for engagement with said fixed contact, said U-shaped conductor being formed to provide a path for current flow through each of said legs in order to create electromagnetic forces induced by the flow of said current for increasing the force which holds the fixed contact and movable contact in engagement with each other, and a solenoid having an armature, said armature being operatively connected to the free end of said other leg portion of said U-shaped conductor for swinging said free end and said other leg portion generally angularly about the bight portion of said U-shaped conductor.

2. An electric switch assembly, comprising a fixed first contact, a generally U-shaped conductor having one leg portion secured to a suitable support and an other leg portion angularly movable between said fixed contact and said one leg portion, a movable second contact carried by said other leg portion adapted for engagement with said fixed contact, said U-shaped conductor being formed to provide a path for current flow through each of said legs in order to create electromagnetic forces induced by the flow of said current for increasing the force which holds the fixed contact and movable contact in engagement with each other, means for mounting said one leg portion in a generally cantilevered position with respect to said support, a solenoid assembly having an armature, said armature being operatively connected to the free end of said other leg portion of said U-shaped conductor for swinging said free end and said other leg portion generally angularly about the bight portion of said U-shaped conductor, said armature being effective upon actuation of said solenoid assembly to angularly swing said other leg portion away from said one leg portion and toward said fixed contact, said armature also being effective to continue angular movement of said other leg after said movable contact engages said fixed contact in order to generally rock said other leg portion about said fixed contact thereby causing said cantilevered one leg portion to move toward said support in order to cause a sliding motion between said fixed and movable contacts.

3. An electric switch assembly, comprising a fixed first contact, a generally U-shaped conductor having one leg portion secured to a suitable support and an other leg portion angularly movable between said fixed contact and said one leg portion, a movable second contact carried by said other leg portion adapted for engagement with said fixed contact, said U-shaped conductor being formed to provide a path for current flow through each of said legs in order to create electromagnetic forces induced by the flow of said current for increasing the force which holds the fixed contact and movable contact in engagement with each other, said U-shaped conductor including a bight portion joining said leg portions to each other, said bight portion being so formed as to resiliently urge said other leg portion and movable contact in a direction away from said fixed contact whenever said movable contact is brought into engagement with said fixed contact, said movable contact being formed integrally with said other leg portion and provided with a generally arcuate contacting surface, said fixed contact being provided with a substantially flat contacting surface for engaging said arcuate contacting surface, means for mounting said one leg portion in a generally cantilevered position with respect to said support, and a solenoid assembly having an armature, said armature being operatively connected to the free end of said other leg portion of said U-shaped conductor for swinging said free end and said other leg portion generally angularly about said bight portion, said armature being effective upon actuation of said solenoid assembly to angularly swing said other leg portion away from said one leg portion and toward said fixed contact, said armature also being effective to continue angular movement of said other leg after said movable contact engages said fixed contact in order to generally rock said other leg portion about said fixed contact thereby causing said cantilevered one leg portion to move toward said support in order to cause a sliding and wiping motion between said fixed and movable contacts.

4. An electric switch assembly, comprising a fixed first contact, a generally U-shaped conductor having one leg portion secured to a suitable support and an other leg portion angularly movable between said fixed contact and said one leg portion, and a movable second contact carried by said other leg portion adapted for engagement with said fixed contact, said U-shaped conductor being formed to provide a path for current flow through each of said legs in order to create electromagnetic forces induced by the flow of said current for increasing the force which holds the fixed contact and movable contact in engagement with each other, said U-shaped conductor including a bight portion which joins said leg portions to each other, said bight portion being so formed as to resiliently urge said other leg portion and movable contact in a direction away from said fixed contact whenever said movable contact is brought into engagement with said fixed contact.

References Cited by the Examiner
UNITED STATES PATENTS

| | | | |
|---|---|---|---|
| 2,186,251 | 1/1940 | Lindstrom | 200—87 |
| 2,695,350 | 11/1954 | Schultz | 200—87 |
| 3,164,700 | 1/1965 | Bodenschatz | 200—87 |

BERNARD A. GILHEANY, *Primary Examiner.*

J. J. BAKER, R. N. ENVALL, Jr., *Assistant Examiners.*